United States Patent
Cipriano

(10) Patent No.: US 7,708,189 B1
(45) Date of Patent: May 4, 2010

(54) IDENTIFICATION VERIFICATION SYSTEM AND METHOD

(76) Inventor: Joseph J. Cipriano, 502 W. 13th St., Austin, TX (US) 78703

( * ) Notice: Subject to any disclaimer, the term of this patent is extended or adjusted under 35 U.S.C. 154(b) by 0 days.

(21) Appl. No.: 10/440,058

(22) Filed: May 16, 2003

Related U.S. Application Data

(60) Provisional application No. 60/381,361, filed on May 17, 2002.

(51) Int. Cl.
*G06F 17/00* (2006.01)

(52) U.S. Cl. .................. 235/375; 235/449; 235/472.01; 235/493

(58) Field of Classification Search ................ 235/375, 235/379–380, 449, 454, 472.02, 493, 472.01; 705/64, 26
See application file for complete search history.

(56) References Cited

U.S. PATENT DOCUMENTS

| | | | |
|---|---|---|---|
| 5,864,623 A | 1/1999 | Messina et al. | |
| 5,966,654 A * | 10/1999 | Croughwell et al. | 455/414.1 |
| 6,089,452 A | 7/2000 | Rhode, III | |
| 6,171,138 B1 * | 1/2001 | Lefebvre et al. | 439/500 |
| 6,196,460 B1 * | 3/2001 | Shin | 235/380 |
| 6,234,389 B1 * | 5/2001 | Valliani et al. | 235/380 |
| 6,442,532 B1 * | 8/2002 | Kawan | 705/35 |
| 6,463,416 B1 | 10/2002 | Messina | |
| 6,475,146 B1 * | 11/2002 | Frelburger et al. | 600/437 |
| 6,523,741 B1 | 2/2003 | DiMaria et al. | |
| 6,612,958 B2 * | 9/2003 | Imai et al. | 475/210 |
| 6,679,425 B1 | 1/2004 | Sheppard et al. | |
| 6,745,937 B2 * | 6/2004 | Walsh et al. | 235/379 |
| 6,854,642 B2 * | 2/2005 | Metcalf et al. | 235/375 |
| 6,920,437 B2 | 7/2005 | Messina | |
| 6,944,782 B2 * | 9/2005 | von Mueller et al. | 713/320 |
| 6,991,159 B2 * | 1/2006 | Zenou | 235/383 |
| 7,035,626 B1 * | 4/2006 | Luciano, Jr. | 455/414.1 |
| 2001/0034222 A1 * | 10/2001 | Roustaei et al. | 455/403 |
| 2001/0041581 A1 * | 11/2001 | Hansson | 455/550 |
| 2002/0002507 A1 * | 1/2002 | Hatakeyama | 705/26 |
| 2002/0025796 A1 * | 2/2002 | Taylor et al. | 455/406 |
| 2002/0046185 A1 * | 4/2002 | Villart et al. | 705/64 |
| 2002/0052193 A1 * | 5/2002 | Chetty | 455/412 |
| 2002/0087478 A1 * | 7/2002 | Hudd et al. | 705/64 |
| 2002/0134837 A1 * | 9/2002 | Kishon | 235/449 |
| 2002/0156676 A1 * | 10/2002 | Ahrens et al. | 705/14 |
| 2003/0078069 A1 * | 4/2003 | Lindeman | 455/550 |
| 2003/0143990 A1 * | 7/2003 | Minear et al. | 455/418 |
| 2004/0104268 A1 * | 6/2004 | Bailey | 235/439 |
| 2005/0131829 A1 | 6/2005 | Messina | |
| 2005/0137987 A1 * | 6/2005 | May et al. | 705/75 |

* cited by examiner

*Primary Examiner*—Edwyn Labaze
(74) *Attorney, Agent, or Firm*—Johnson & Associates

(57) ABSTRACT

A method and apparatus is provided for verifying the validity of ID cards. A card reading device reads an ID card and transmits a request to a database server. A database is queried and a reply is sent back to the card reading device indicating whether the ID is valid. If desired, the reply can include additional information, such as a description of the ID holder. The ID verification system can be used to help verify whether an ID belongs to the ID holder. The system can also log and timestamp events for future access.

29 Claims, 2 Drawing Sheets

IDENTIFICATION VERIFICATION SYSTEM AND METHOD

CROSS REFERENCE TO RELATED APPLICATIONS

This application claims priority under 35 U.S.C. §119 to co-pending, commonly owned U.S. provisional patent application Ser. No. 60/381,361 filed on May 17, 2002, entitled IDENTIFICATION VERIFICATION SYSTEM.

FIELD OF THE INVENTION

This invention relates to the field of identification systems. In particular, this invention is drawn to a system and method for real-time identification verification.

BACKGROUND OF THE INVENTION

A typical identification (ID) card includes information about the cardholder such as name, address, a physical description, and picture. Most ID cards also contain some sort of machine-readable identifier such as a magnetic stripe, a bar-code, a smart chip, etc. ID cards are typically used to restrict access to areas or products to unauthorized cardholders. For example, laws in every state require a person to be at least a minimum age to purchase alcohol or tobacco products. Similarly, in most states, a patron must be at least a minimum age to enter a bar. Typically, to verify that a person meets age requirements, the person must present an ID card prior to purchasing products or prior to being admitted to an establishment having age requirements.

There are numerous problems with using ID cards for the purposes mentioned above. One problem relates to fake or altered ID cards. It is very common for under age people to obtain fake or altered ID cards that show that the cardholder meets a minimum age requirement. In addition, it is common for under age people to use a valid ID card belonging to someone else. The quality of many fake or altered ID cards is such that it is extremely difficult to distinguish or determine the validity of an ID card.

Another problem relating to ID cards is that it is cumbersome to verify their authenticity. For example, when a law-enforcement officer verifies the validity of an ID card, the officer typically gets on a radio and reads the ID number to a remote person who has the ability to verify the validity of the ID. This procedure is labor intensive and time-consuming for the officer.

There is therefore a need for a system that quickly and easily verifies the validity of ID cards.

SUMMARY OF THE INVENTION

An apparatus of the invention is provided for verifying the validity of ID cards comprising: a web-enabled cellular telephone; a magnetic stripe reader connected to the cellular telephone for reading ID numbers from ID cards; and software installed in the cellular phone to facilitate the transmission of ID numbers to a remote database and the reception and display of information relating to the transmitted ID numbers.

Another embodiment of the invention provides an apparatus for verifying the validity of ID cards comprising: an ID card input device for receiving an ID number from an ID card; a wireless transceiver for transmitting a messages to a remote database and receiving replies from the remote database; and a display for displaying information relating to the replies.

Another embodiment of the invention provides a method of verifying the validity of ID cards comprising the steps of: providing a card reading device; providing a remote database containing ID information; reading an ID card using the card reading device; sending a message to the remote database; querying the database for a match to the read ID card; and in response to the message, sending a reply message back to the card reading device, wherein the reply message contains information about the read ID card.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In general, the present invention provides a real-time identification verification system and method that can be used to verify the validity of an ID, as well as help to verify that the ID belongs to the ID holder. The present invention has various optional features, as well as various uses, examples of which are described below.

Figure 1:
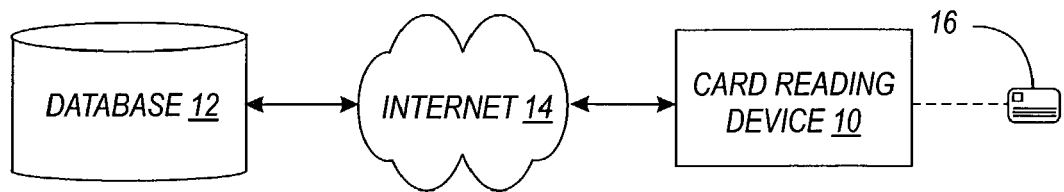
FIG. 1 is a block diagram illustrating one example of an environment in which the present invention may be used.

The present invention may be used in numerous environments. FIG. 1 is a block diagram illustrating one example of an environment in which the present invention may be used. FIG. 1 shows an ID card reading device 10 that is in communication with a database 12 via the Internet 14 or some other manner (e.g., phone lines, etc.). The card reading device 10 may communicate with the database 12 wirelessly (e.g., via a cellular network, WiFi (802.11b), radio, etc.), over a network, or in any other desired way. The ID card 16 shown in FIG. 1 may include at least one of the following: an ID number, a PIN number, a magnetic stripe, a smart chip, a bar code (1-dimensional, 2-dimensional, etc.) and/or a photograph. The ID card reading device 10 is capable of reading (via a magnetic stripe reader, bar-code scanner, smart card reader, text recognition system, voice recognition system, optical card reader system, keypad for manual entry, querty keyboard, and/or any other desired device) the ID card 16 presented by an ID holder.

Figure 2:
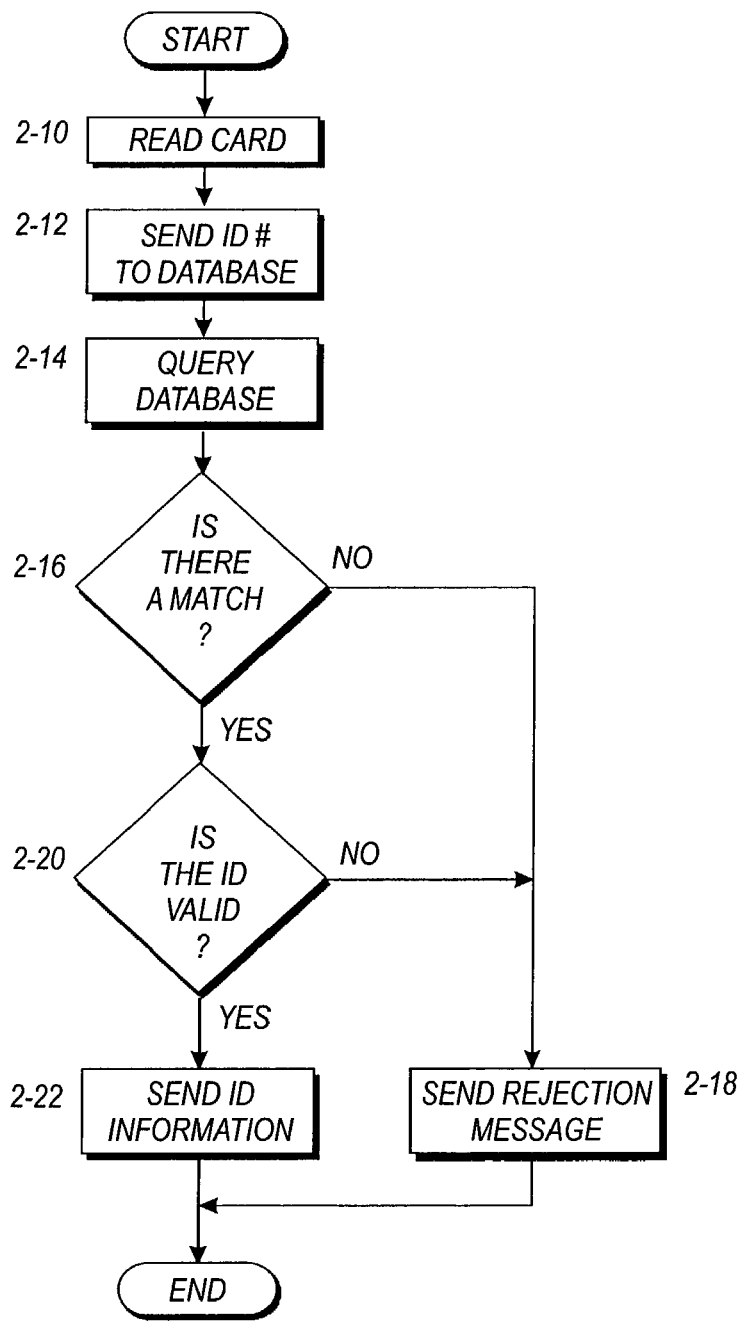
FIG. 2 is a flowchart illustrating one example of the use of the invention.

The present invention has many uses. Following is one example of a use of the identification verification system of the present invention. FIG. 2 is a flowchart illustrating an example of the use of the invention. One example of when the process illustrated in FIG. 2 would be used is when an ID holder desires to enter an establishment or purchase a product that has age restrictions. The process begins at step 2-10 where the ID card reading device 10 reads the ID card. Next, at step 2-12, the device sends an ID number (or other read information) to the database 12 of a service provider. Next, at step 2-14, the database 12 is then queried. At step 2-16, the process determines whether a match was found. If there is no match in the database, then a rejection message is sent back to the device at step 2-18. If a match was found, the process proceeds to step 2-20, where the process determines whether the ID is valid. If the ID is not valid, then a rejection message is sent back to the device at step 2-18. For a valid ID, the service provider responds to the request at step 2-22 by sending back ID information to the device 10. The ID information sent back to the ID reading device 10 may include any desired information, such as a valid/invalid message, a name, an address, a photo, a physical description of the ID holder, etc.

In one example, biometric information is stored on an ID card. Prior to reading an ID card, biometric information from an ID card holder is compared with the biometric information stored on the ID card to verify that a person presenting an ID card matches the biometric information stored on the ID card. Once a match is made, the process described above continues (e.g., beginning with step 2-10 in FIG. 2).

If desired, the card reading device can selectively display or store various information. For example, a listing of the IDs read during a particular time period can be read. Also, if desired, the card reading device can provide a listing of patrons in an establishment which can be used for things such as running promotions, marketing, building customer databases, etc. Similarly, data can be stored at the database for similar uses.

In one example, the present invention provides a web-enabled database system as a tool to combat ID fraud and underage use of alcohol and tobacco. The invention enables bars, restaurants, package stores, convenience stores and all other retailers of alcohol and tobacco products, as permitted users of this type of restricted data, to verify the age of an individual and the validity of a state drivers license or ID card presented as proof of age and/or identification.

In one example of the database of the present invention, the database contains all current state drivers licenses and identification cards, obtained from state departments (e.g., in Texas, from the Texas Department of Public Safety (DPS)). The database may include data from multiple states, or from a national database. The database is loaded onto servers linked to the Internet. The database may be updated as frequently as desired, or as frequently as the data is available from states. In addition, the database may contain state license/permit information that entities must have to sell liquor, tobacco, etc. For example, for a database in Texas, the database may contain all Texas Alcoholic Beverage Commission ("TABC") license/permit information ("TABC Permit Number") available from TABC. A web site may be provided on the Internet, allowing permitted users to have encrypted access to the database.

Figure 3:
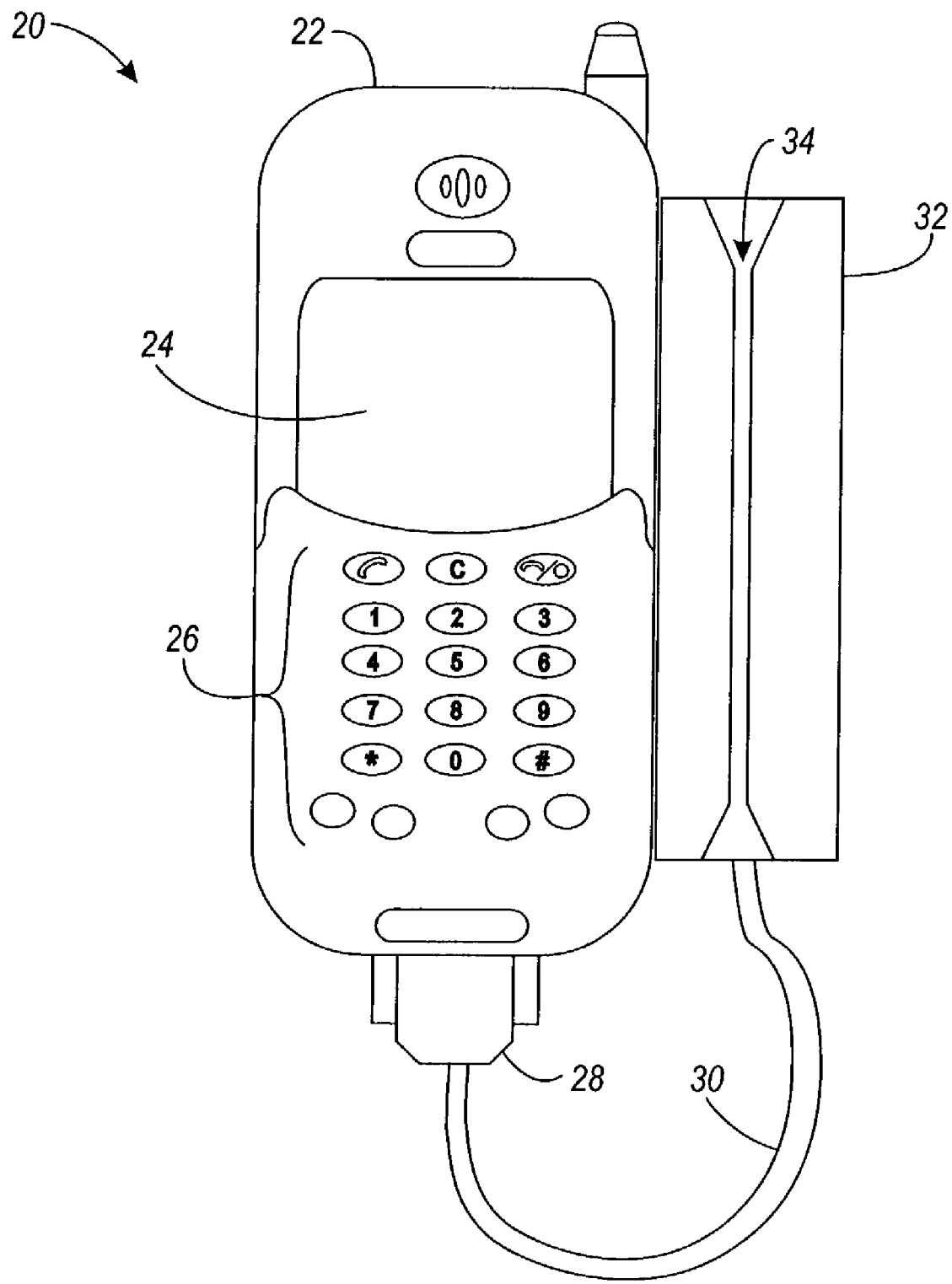
FIG. 3 is a view of one example of a card reading device of the present invention.

A licensed establishment ("customer"), as a permitted user of the invention for verification purposes, could use the invention (e.g., as illustrated in FIG. 2) to check both the age of an ID holder and the validity of an ID when an individual presents the ID to the customer (by typing in the Drivers License or ID number, or by scanning the information from the card with a machine-readable device). The customer will be able to choose the input device from a range of equipment, including, but not limited to, computers, PDA's, wireless devices including cell phones, networked cash registers, etc. In one embodiment, the chosen equipment includes a web-enabled browser. One suitable input device is comprised of a combination 3G cell phone/PDA that receives an ID identification number (from a card reading device or from a manual entry) and generates the appropriate requests to be sent to the service provider. FIG. 3 is a view of one example of a card reading device 20 of the present invention. FIG. 3 shows a PDA cell phone 22 (such as a Kyocera model 6035 PDA phone). Of course, other devices may also be used, such as Palm Pilots, Compaq IPAC's, or a Blackberry, etc. The cell phone 22 may include voice capabilities, but such capabilities are not required. The PDA cell phone 22 includes conventional features such as a display 24, keypad 26, processor, transceiver (not shown), etc. Attached to the phone (via connector 28 and cord 30) is a magnetic stripe reading device 32 which is capable of reading the magnetic stripe on an ID card when the card is swiped through the slot 34. The embodiment shown in FIG. 3 provides one example of a real-time wireless ID verification device. In some configurations, the magnetic stripe reading device may be integrated into the cell phone/PDA case itself. Thus no wires will be visible or present.

The functions of the card reading device are implemented using software applications. For example, in the example of the PDA 3G phone, Java applications can be stored in the phone to execute the necessary functions. Of course, many desired computer languages can be used (e.g., C++ for Microsoft platforms).

In addition to, or in place of the display 24, the card reading device can use other user perceivable devices to convey received information to a user. In one example, one or more lights can be provided to convey certain information. For example, when an ID is invalid or a person is underage, a red light could be activated. Similarly, when an ID is valid and/or a person is not underage, a green light could be activated. In another example, a speaker or headphone jack can be used to provide audio information to a user. In this example, the device may also include recorded speech or a text to speech processor to generate verbal messages (e.g., "ID valid", "ID not valid", "underage", "legal age", "arrest warrant outstanding", "error reading ID", "re-enter ID", etc.) to a user, which would allow a user to receive information without having to read a display. In another example, an infrared signal could be sent to a printing device and a ticket or authorization card could be given to a patron or a visitor.

Referring back to the example above, after a patron's ID is entered, the device will transmit the ID number to the database server of a service provider. The server will then compare the ID number to the driver's license and ID database. If the ID number is invalid, that information will be returned to the customer's device for display to the customer. If the ID is valid, the server will return to the customer's device, the patron's name, birth date, calculated age and, if available in the database, the patron's physical description or photograph as stored in the database. The customer can then compare that information to the presented ID and also to the presenter, to be certain that the person presenting the ID is the person whose description appears on the ID.

In one example, when the server receives the information, a record is inserted into the database archive, including the permit number, the drivers license or ID number, and a date and timestamp. This information is available to the customer to answer inquiries made by state authorities relating to an infraction of a rule or law. Any desired information relating to the transaction can be saved in the database. In one example, no information is saved other than that created by the timestamp procedure, and that information is erased from the database if not used within the time period specified by state or federal law or the state alcoholic beverage commission for its statute of limitations for infractions (in one example, six months) after it is saved. This feature of the invention has numerous applications. For example, a customer can use the stored information to help reduce liability in the event that the customer is accused of some infraction of the law relating to the sale or alcohol or tobacco (i.e., the invention can be used to verify performance of age-compliance checks). In another example, a customer may be able to use the fact that the information is archived to reduce the cost of liability insurance ("Dram Shop" insurance). In another example, the timestamped information that is stored can be cross-referenced with timestamped video surveillance records in case the customer or law enforcement official's later need to determine who actually presented a particular ID.

Another optional feature of the invention relates to sponsorship of ID verification devices. Sponsors who desire to be associated with the effort to curb underage drinking and smoking can be invited to contribute to help defray the customer's device cost and to provide promotional documentation to potential customers. Sponsors can be credited individually (e.g., on the web site, etc.) for their participation in the effort to combat underage drinking and smoking. In addition, sponsors will be able to use their participation in the program for advertising as well as promotional activities.

The present invention may be implemented in numerous way, but following is one example of implementation of the invention using a registration process. A registration process may be included on the service provider's web site. Following is an example of an exemplary registration process that may be provided. To register, a customer can provide the customer's assigned license number, credit card information for billing purposes, and a signed Certificate of Permitted Use of the data (where access to data in the database is restricted by law for approved users or purposes). The customer can print out, sign and fax back the Certificate of Permitted Use found on the website or request a Certificate be faxed or mailed to customer from the service provider. In either case, the customer registration will not be complete, and the customer will be denied access to the data, until the signed Certificate reaches the service provider. The customer may be charged a one-time setup fee and an annual license fee. Thereafter, the customer may be charged a monthly amount for usage based upon volume.

Following is another example of the use of the present invention. In the example, a central site is established which contains email and database servers. The central site is located in a secure facility, with adequate power and server redundancy. In fact, the secure facility may be sufficient to meet FBI and/or INTERPOL requirements for a secure, encrypted environment. A customer registers for the service and obtains from the service provider, or another source, a card reading device (for example, a Kyocera 6035 mobile phone, a Motorola i88s, or a RIM/Blackberry, etc.) which will read, transmit and receive back the ID information. When a patron enters the customer's establishment (bar, restaurant, convenience store, grocery store, etc.), and the establishment checks that person's ID, the drivers license or ID number is entered into the device. In this example, the card reading device is already loaded with the customer's permit number for the customer's location. The permit number and the read license number are transmitted to the central site email server over a wireless telephone network (for example, a cellular network) using a Short Messaging System (SMS) message. The central site email server is continually polled for incoming messages. When received, the received message is parsed for data. The license or ID number in the message is then matched to the database. If a match is not found, an appropriate rejection message is sent back to the sending device. If a match is found, a reply is sent to the sending device, including, for example, license number, name, birth date, calculated age, and if available and authorized by law, the cardholder's physical characteristics, including race, height, weight, hair color and eye color, and/or arrest warrant information. After transmission, the database archive is updated with permit number (to identify customer's establishment), drivers license or ID number, date and time of the ID check, and all other desired data transmitted to customer's sending device. If required by law, archived data will be derived from the service provider's database, except perhaps the customer's Permit Number, which will be recorded from the data sent by the sending device.

This age-verification and anti-fraud tool of the present invention is available for use by all establishments which have a need to verify a patron's age or the validity of a drivers license or ID offered by the patron as identification.

In another example, the card reading device can include a fingerprint reader for reading the ID presenter's fingerprint. If an ID stores a fingerprint, the scanned fingerprint can be compared to the fingerprint on the ID. Similarly, if the service provider sends back fingerprint information, the device can compare the fingerprint stored in the database with the scanned fingerprint to ensure that the ID presenter is the person identified on the ID. In one example, a person presents an ID card with his/her fingerprint (or other biometric) template stored on the card. A device attached to the card reader or a separate device is used to verify the card template to the live fingerprint/biometric. If a match is positive, the device is then used to verify remote database information, and retrieve personal information or a photograph or information about what the person is allowed to do, i.e., load baggage into an airplane cargo hold.

The present invention may be used for various applications in addition to what has been described above. For example, law enforcement officers could use the invention to get drivers license information without being in a squad car, or having to tell an operator the ID number over the radio, and INS officers could use the device at border crossings to check the validity of INS ID's issued to legal aliens who cross and recross the border. In another example, movie theaters could use the present invention to verify whether someone is old enough to see a restricted move. Similarly, universities and colleges can use the invention to verify student IDs. Also, private entities, such as warehouse clubs, could use the invention to verify memberships, using a private database.

In another example, Homeland Security could verify the validity of a United States visa or visitor's card, etc. and determine the expiration date and/or compare the expiration date of a visa or permit to the expiration date of a valid US driver's license issued in the same name. The device could also compare the visa holder's permanent address with the address presented on the driver's license.

The device can be used to uniquely identify each magnetic stripe card using, for example, a technology such as Magneprint, developed by MAGTEK. This property of every magnetic stripe card servers as a unique identifier for each card. The Magneprint is sent to the card issuer so that the card can be validated as the authentic original card. Following this verification, the device can then access the relevant database in the manner described above.

As mentioned, the present invention can be used for numerous applications. In addition to the examples mentioned above, the present invention can be used by airport security personnel, law enforcement officials, private clubs, schools, etc.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A wireless device for verifying validity of personal identification (ID) cards comprising:
   a web-enabled cellular telephone;

a magnetic stripe reader connected to the cellular telephone for reading ID numbers from personal ID cards; and software installed in the cellular phone to facilitate transmissions of ID numbers read from one or more personal ID cards to a remote database and reception and display of information relating to the validity of the one or more read personal ID cards.

2. The wireless device of claim 1, wherein the displayed information relates to an age of an ID card holder.

3. An apparatus for verifying validity of personal ID cards comprising:

an ID card input device for receiving an ID number from a personal ID card;

a wireless transceiver for transmitting messages to a remote database and receiving replies from the remote database; and a display for displaying information relating to the replies, wherein the information includes information relating to the validity of the personal ID card.

4. The apparatus of claim 3, wherein the ID card input device is comprised of a magnetic stripe reader.

5. The apparatus of claim 3, wherein the ID card input device is comprised of a bar code scanner.

6. The apparatus of claim 3, wherein the ID card input device is comprised of a smart card reader.

7. The apparatus of claim 3, wherein the ID card input device is comprised of a key pad.

8. The apparatus of claim 3, wherein the ID card input device is comprised of a querty keyboard.

9. The apparatus of claim 3, wherein the ID card input device is comprised of an optical card reader.

10. The apparatus of claim 3, wherein the wireless transceiver is a cellular telephone.

11. A method of verifying validity of personal ID cards comprising the steps of:

providing a card reading device;

providing access to a remote database containing ID information;

reading a personal ID card using the card reading device;

sending a message to the remote database;

querying the database for a match to the read personal ID card; and in response to the message, sending a reply message back to the card reading device, wherein the reply message contains information relating to the validity of the read personal ID card.

12. The method of claim 11, further comprising the step of displaying information relating to the reply message.

13. The method of claim 11, wherein the sent message includes an ID card number.

14. The method of claim 11, wherein the reply message relates to an age of an ID card holder.

15. The method of claim 11, wherein the reply message includes a physical description of an ID card holder.

16. The method of claim 11, further comprising the step of providing a magnetic stripe reader for reading the ID card.

17. The method of claim 11, further comprising the step of providing a bar code scanner for reading the ID card.

18. The method of claim 11, further comprising the step of providing a smart card reader for reading the ID card.

19. The method of claim 11, further comprising the step of providing a keypad for manually reading the ID card.

20. The method of claim 11, further comprising the step of generating a log of queries to the database.

21. The method of claim 20, further comprising the step of using the log to verify compliance with rules relating to the reading of ID cards.

22. A method of verifying validity of a drivers license containing machine readable information, the method comprising:

providing a hand-held wireless device having a card reading device, a transceiver, and a display;

configuring the hand-held wireless device to have access to a remote database containing drivers license information;

reading a drivers license using the card reading device;

wirelessly transmitting a message to query the remote database for a match to the drivers license read by the card reading device;

after transmitting the message, receiving a reply message containing information relating to the drivers license's validity; and displaying information to indicate to a user whether the drivers license is valid.

23. The method of claim 22, wherein the reply message includes a physical description of a drivers license card holder.

24. The method of claim 22, wherein the reply message includes an age of a drivers license card holder.

25. The method of claim 22, wherein the card reading device includes a magnetic stripe reader for reading a magnetic stripe on a drivers licensee.

26. The method of claim 22, wherein the card reading device includes a bar code scanner for reading a bar code on a drivers licensee.

27. The method of claim 22, further comprising generating a log of queries to the remote database.

28. The method of claim 27, further comprising using the log to verify compliance with laws or rules relating to age restrictions.

29. The method of claim 22, wherein the remote database contains drivers license information for a plurality of drivers licenses, and wherein the hand-held wireless device is configured to have access to the remote database such that any drivers license can be verified as being valid or invalid, with respect to the remote database.

* * * * *